(12) United States Patent
Kim

(10) Patent No.: US 8,924,013 B2
(45) Date of Patent: Dec. 30, 2014

(54) METHOD AND SYSTEM FOR PATH PLANNING AND CONTROLLING

(75) Inventor: Chyon Hae Kim, Wako (JP)

(73) Assignee: Honda Motor Co., Ltd., Tokyo (JP)

( * ) Notice: Subject to any disclaimer, the term of this patent is extended or adjusted under 35 U.S.C. 154(b) by 0 days.

(21) Appl. No.: 13/359,833

(22) Filed: Jan. 27, 2012

(65) Prior Publication Data

US 2012/0203420 A1 Aug. 9, 2012

(30) Foreign Application Priority Data

Feb. 4, 2011 (JP) ................................. 2011-022742

(51) Int. Cl.
*G05B 19/04* (2006.01)
*G05D 1/08* (2006.01)

(52) U.S. Cl.
CPC . *G05D 1/08* (2013.01); *Y10S 901/01* (2013.01)
USPC ............. 700/246; 700/245; 700/262; 700/14; 700/269; 700/306; 701/23; 701/26; 414/1; 901/1

(58) Field of Classification Search
CPC ...... B25J 9/1666; B25J 9/1664; B25J 9/1669; B25J 6/162; B25J 9/1671; B25J 9/1694; G05D 2201/0213; G05D 2201/0217; G05D 1/0212; G05B 2219/40476
See application file for complete search history.

(56) References Cited

U.S. PATENT DOCUMENTS

| | | | | |
|---|---|---|---|---|
| 4,338,672 A | * | 7/1982 | Perzley et al. ................ | 700/249 |
| 6,493,607 B1 | * | 12/2002 | Bourne et al. ................ | 700/255 |
| 8,185,265 B2 | * | 5/2012 | Nagano ........................... | 701/25 |
| 8,249,810 B2 | * | 8/2012 | Jones ............................. | 701/533 |
| 8,255,083 B2 | * | 8/2012 | Weiss et al. ................... | 700/252 |
| 8,392,117 B2 | * | 3/2013 | Dolgov et al. ................. | 701/533 |
| 2008/0306628 A1 | * | 12/2008 | Ng-Thow-Hing et al. ... | 700/245 |

(Continued)

FOREIGN PATENT DOCUMENTS

| | | |
|---|---|---|
| JP | 07-306707 A | 11/1995 |
| JP | 2000-339012 A | 12/2000 |
| JP | 2002-073130 A | 3/2002 |
| JP | 2009-211571 A | 9/2009 |

OTHER PUBLICATIONS

Pedro S. Huang, "Planning for Dynamic Motions Using a Search Tree," a graduate thesis of University of Toronto, 1996, 67 pp.

(Continued)

*Primary Examiner* — Helal A Algahaim
*Assistant Examiner* — Paul Castro
(74) *Attorney, Agent, or Firm* — Squire Patton Boggs (US) LLP

(57) ABSTRACT

A path planning system for bringing state of an object into a target state includes a search tree production unit for producing in advance, in a state space with said target state defined as a root, a search tree having a branch at each one of a plurality of sections of the state space, said state space being divided into the plurality of sections in advance. The system also includes a search tree memory unit for storing the search tree, and a path generation unit for determining, a route on the search tree from the branch corresponding to the current state to the root. The path planning/control system further includes a path control unit for controlling the path of the object to bring the state of the object into the target state in accordance with the route on the search tree determined by the path planning system.

12 Claims, 14 Drawing Sheets

(56) References Cited

U.S. PATENT DOCUMENTS

2010/0168950 A1* 7/2010 Nagano .......................... 701/25
2010/0264216 A1* 10/2010 Kenefic ........................ 235/400
2014/0081506 A1* 3/2014 Pack et al. ...................... 701/27

OTHER PUBLICATIONS

Office Action dated Sep. 2, 2014, issued in corresponding JP Application No. 2011-022742.

* cited by examiner

METHOD AND SYSTEM FOR PATH PLANNING AND CONTROLLING

BACKGROUND OF THE INVENTION

The present invention relates to a path set-up method and a path set-up system for producing a state transition sequence to reach a target state, and more particularly to a path control method and path set-up method and control system for controlling a path according to a produced path.

State (posture, speed) of a machine may be determined as a position in a phase space and motion of the machine may be determined as a path in the phase space. From time to time, the machine is desired to move from an initial state to a target state. Specific examples follow.

A first example is a case where a humanoid robot loses its balance. An initial state for this case is the posture/speed of the robot immediately after it lost balance, and a target state is a stable posture (upright posture with zero speed).

A second example is a case where an airplane loses balance and stalls. An initial state in this case is a posture/speed immediately after the airplane lost balance, and a target state is a state in which wings and the body are made level and travel straight with constant velocity.

Other examples may be a case wherein a bicycle bumps into a stone to lose balance, which needs be rectified, and a case wherein a car slips.

To control a machine from its initial state into a target state, PID control scheme and potential scheme may be used. But, with these schemes includes a problem that the machine may not work properly depending on the state where the machine lost balance. This problem stems from a fact that with these schemes a broad range of initial state is not permitted in transition of the state of the machine to a target state on a phase space. With the PID control scheme and the potential scheme, the time at which the machine reaches the target state can hardly be defined, and the target state is difficult to reach within a short time.

One way to set up a path planning in the state space includes describing the state transition in the state space as a search tree. In this scheme, a predetermined number of branches are derived from a root or a branch and search is performed for each branch. If the number of branches is N, and depth of the tree is M, the number of branches to be searched is $N^M$. Accordingly, the computation cost for searching all the derived branches becomes huge.

Document 1 identified below proposes a scheme wherein a evaluation function for branches of a search tree is defined and branches are derived from only those branches that are selected according to the evaluation function. With this scheme computation cost may be reduced. But, the evaluation function needs be determined for each object based on expertise of a designer. Search may not be sufficiently performed with some evaluation functions. Accordingly, searching in the state space will have considerable constraints with this scheme.

Conventional schemes of using evaluation functions as well as the above mentioned schemes entail excessively large computation cost (computation time) for production and control of real time path planning.

Document 1: Pedro S. Huang, "Planning For Dynamic Motions Using a Search Tree", a graduate thesis of Toronto Univ., (1996)

SUMMARY OF THE INVENTION

Accordingly, there is a need for a path planning method and a path control system that is capable of determine a path from various initial states of an object or a machine to a target state at a low computation cost without constraints for search. Also, there is a need for a path control method and a path control system that is capable of controlling a path along the determined path to the target state.

A path planning method according to a first aspect of the present invention a path planning method of determining a path for controlling a state of an object into a target state with a path planning system. The present method comprises a step of producing, by a search tree production unit, in a state space with said target state defined as a root, a search tree having a branch at each one of a plurality of sections of the state space, said state space being divided into the plurality of sections in advance, a step of determining, by the path generation unit, a current state of said object, a step of determining, by the path generation unit, a branch of the search tree that corresponds to the current state, and a step of determining, by the path generation unit, as a path of the object, a route on the search tree from the branch corresponding to the current state to the root.

According to the present method, as a search tree having a branch for each of the plurality of sections of the state space that is divided into the plurality of sections in advance, and as a path of the object is determined as a route on the search tree, a path from various initial states of the object to a target state may be determined at a low computation cost without substantial constraints to the search.

In one embodiment, motion of the object is restricted by defining the range of state space to which states may belong. According to this embodiment, for example, a region where obstacles may exist may be excluded from the region to which states may belong. This way, the object may be moved avoiding the obstacles.

In another embodiment, each one of the branches of the search is determined as the state that is a predetermined time interval or a multiple of the predetermined time intervals prior to the target state.

In further another embodiment, the object includes one or more members whose ends are connected by joints except tip ends. According to this embodiment, path planning can be conducted for an object including one or more members whose ends are connected by joints except tip ends at a low computation cost without substantial constraints for search.

In one embodiment, the object is a member of a robot. According to this embodiment, path planning for the members of a robot may be conducted at a low computation cost without substantial constraints for search.

In another embodiment, the state space is a phase space. According to this embodiment, a path may be efficiently determined by the use of phase space.

In one aspect of the present invention a method of path control is provided. The method comprises, in accordance with the route on the search tree determined by the method of claim 1, controlling the path of the object to bring the state of the object into the target state.

According to this aspect of the invention, path control from various initial states to the target state may be conducted at a low computation cost.

In one embodiment of the method of path control, the method of controlling the path of the object to bring the state of the object into the target state includes, determining a new route on the search tree by defining a branch of the tree that is close to a current state of the object, and controlling the path according to one of a previous route on the search tree and the new route.

According to this embodiment, even when a current state deviates from an initial route or path, the cost of computing a new path is low, facilitating real time processing.

In another aspect of the present invention, a path planning system for bringing state of an object into a target state is provided. The system comprises a search tree production unit for producing in advance, in a state space with said target state defined as a root, a search tree having a branch at each one of a plurality of sections of the state space, said state space being divided into the plurality of sections in advance, a search tree memory unit for storing the search tree, and a path generation unit for determining, as a path of the object, a route on the search tree from the branch corresponding to the current state to the root.

According to the path planning system of this aspect of the invention, a search tree having a branch at each one of a plurality of sections of the state space is provided in advance, and a route on the search tree from the branch corresponding to the current state to the root is determined as a path. Thus, paths from various initial states to the target state may be determined at a low computation cost without substantial constraints to search.

In one embodiment of the path planning system, motion of the object is restricted by defining the range of state space to which states may belong. According to this embodiment, for example, a range where obstacles may exist may be excluded from the range to which the states may belong so that the object may move avoiding the obstacles.

In one embodiment of the path planning system, motion of the object is restricted by defining constraints to dynamic relations in the predetermined time intervals. According to this embodiment, an upper limit may be provided to the applied torque so that motion of the object may be made practical.

In one embodiment of the system, the state space is a phase space. According to this embodiment, with the use of phase space, paths may be determined efficiently.

According to a second aspect of the present invention, a path planning/control system is provided. The system comprises the path planning system according to claim 9, and a path control unit for controlling the path of the object to bring the state of the object into the target state in accordance with the route on the search tree determined by the path planning system.

According to the path planning/control system of this aspect of the invention, path control from various initial states to a target state may be conducted at a low computation cost.

In one aspect of the invention, a robot incorporating the path planning/control system is provided. In this aspect, the object is a member of the robot, which is controlled by the robot according to the route on the search tree.

DESCRIPTION OF THE PREFERRED EMBODIMENTS

Figure 1:
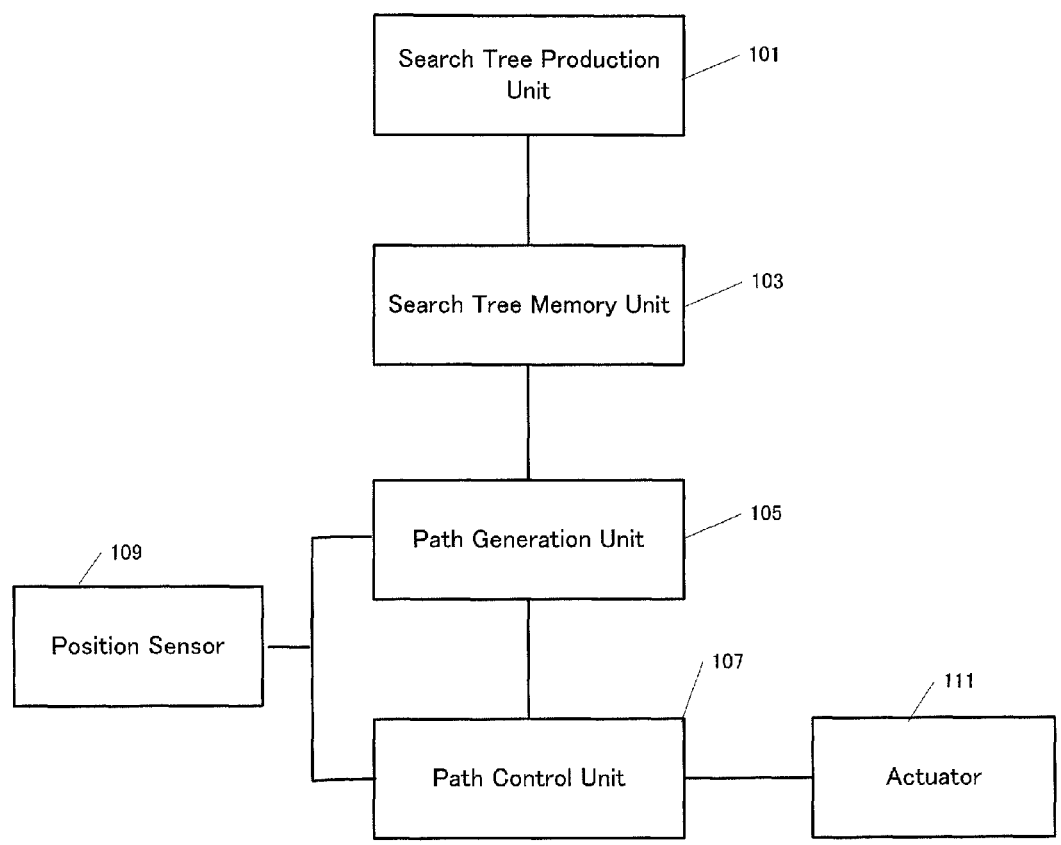
FIG. 1 illustrates a composition of a path planning/control system according to one embodiment of the present invention.

FIG. 1 illustrates a composition of a path planning/control system 100 in accordance with one embodiment of the present invention. System 100 comprises a search tree production unit 101 that produces a search tree having branches corresponding to the states of an object on a state space, a search tree memory unit 103 for storing one or more search trees produced by search tree production unit 101, and a path generation unit 105 that generates a path to a target state using the search trees stored in memory unit 103. System 100 further comprises a path control unit 107 that performs path control using the path generated by path generation unit 105, a position sensor 109 for detecting a position of the object, and an actuator 111 for moving the object. The details of the function of these units will be described hereafter.

Figure 2:
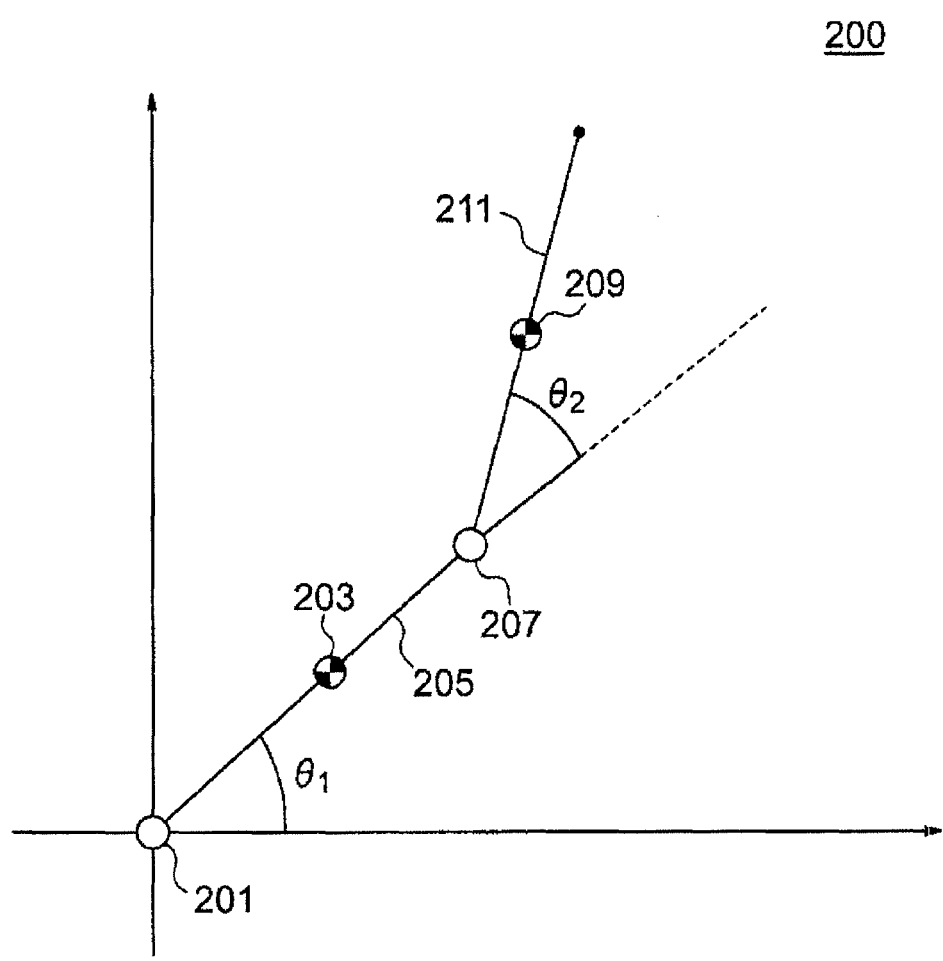
FIG. 2 illustrates a composition of an inverted pendulum with two degrees of freedom.

FIG. 2 illustrates an inverted pendulum 200 with two degrees of freedom. In the description of the present embodiment, an object is the inverted pendulum 200 with two degrees of freedom moving in a two dimensional plane. The inverted pendulum 200 with two degrees of freedom comprises a first link 205, a second link 211, a first joint 201 connecting the first link 205 to a stationary point, and a second joint 207 rotatably connecting the first link 205 and the second link 211. Centers of gravity of the first link 205 and the second link 211 are shown with reference numbers 203 and 209 respectively.

Figure 3:
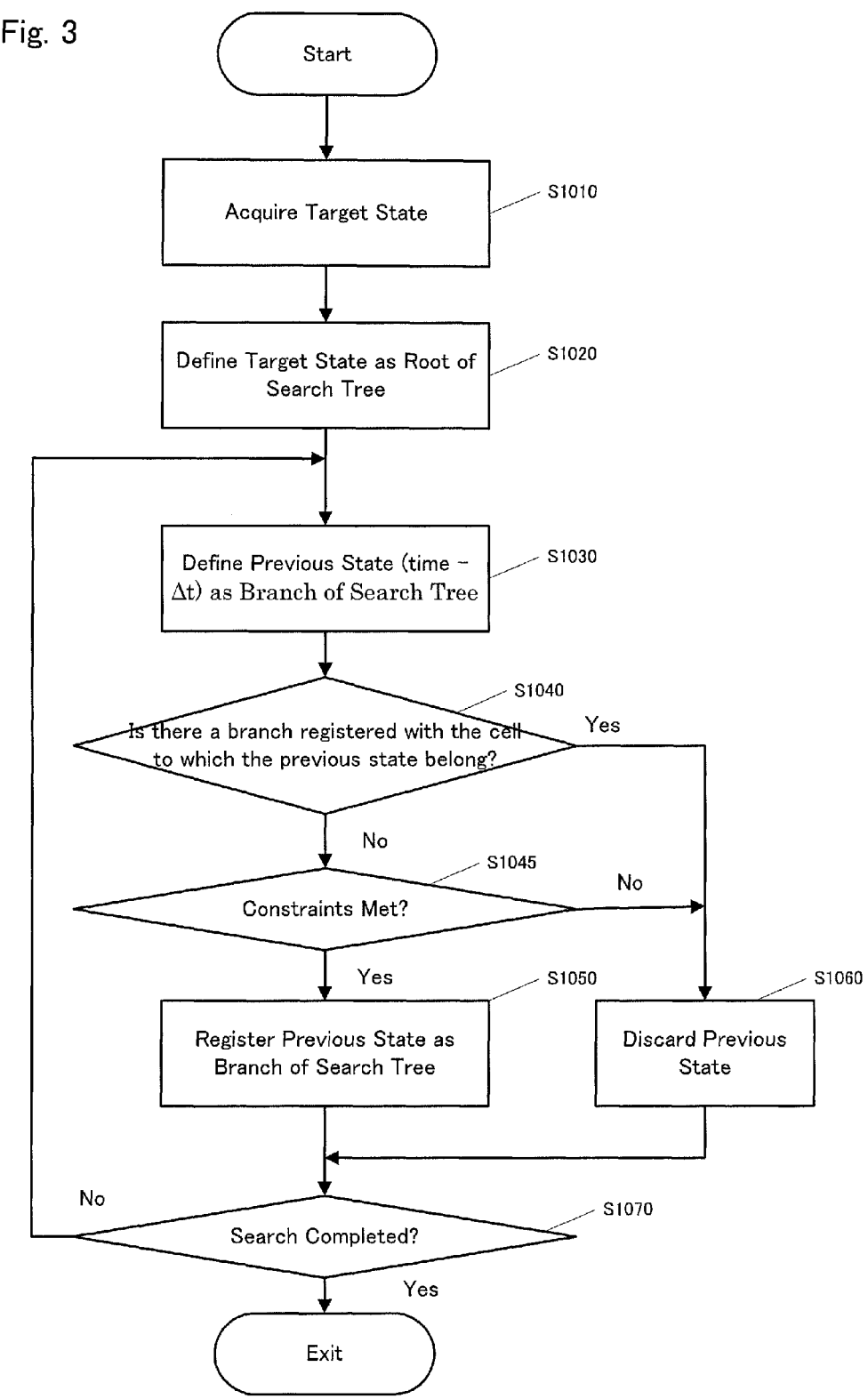
FIG. 3 is a flow chart of a process for producing a search tree on a phase space.

The motion of the inverted pendulum 200 with two degrees of freedom is defined by torque given to the first joint 201 and the second joint 207, and may be expressed in terms of angle $\theta_1$ of the first link 205 relative to X axis, angle $\theta_2$ of the second link 211 relative to the first link 205, and angular velocity $\dot{\theta}_1$, $\dot{\theta}_2$ of these angles. Thus, in the present embodiment, the following phase space in employed as a state space:
$(\theta_1, \theta_2, \dot{\theta}_1, \dot{\theta}_2)$ FIG. 3 is a flow chart showing the process of producing search tree in the phase space performed by the search tree production unit 101. In step S1010, the search tree production unit 101 acquires a target state of the object. In step S1020, the search tree production unit 101 defines the target state of the object as a root of the search tree.

In step S1030, the search tree production unit 101 defines the state at time t−Δt, that is the time before a predetermined interval in the phase space, as a branch of the search tree. The state before a predetermined interval is determined by the equation of motion or dynamic simulation. As mentioned above, the motion of the inverted pendulum 200 with two degrees of freedom is determined by the torque given to the first joint 201 and the second joint 207. Therefore, the state of the inverted pendulum 200 with two degrees of freedom before the predetermined time interval is determined when the torques given to the first joint 201 and the second joint 207 at the predetermined time interval are determined. Thus, the torques given to the first joint 201 and the second joint 207 at the predetermined time intervals may be varied between the maximum value and the minimum value by a predetermined increment, and the state before the time interval may be determined for each case. Accordingly, an overall search may be performed by varying the torque with the predetermined increment between the maximum value and the minimum value.

Figure 4:
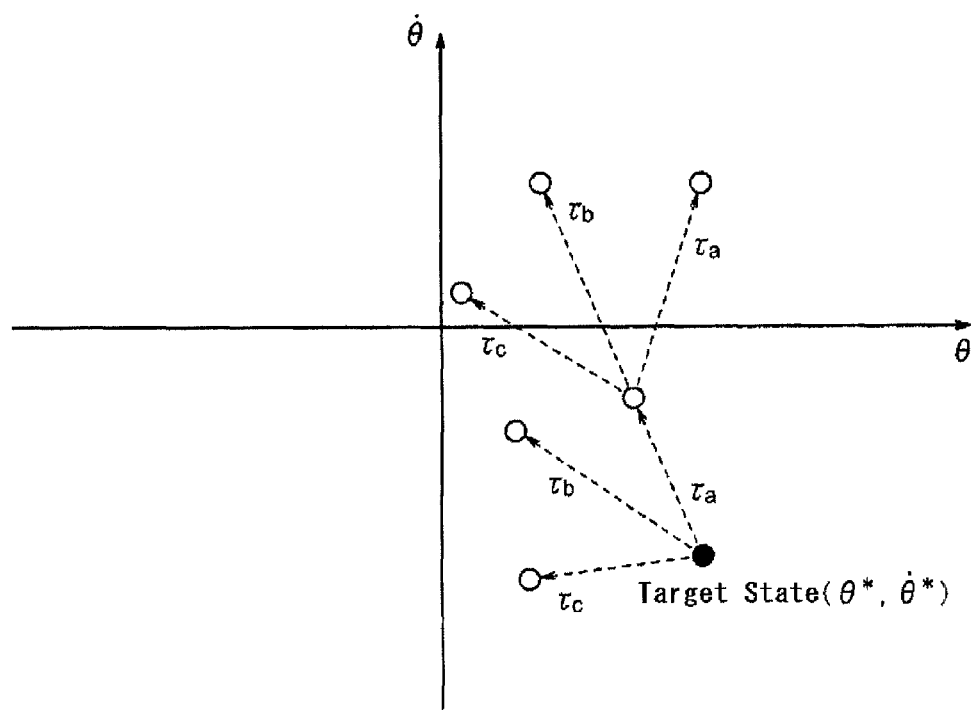
FIG. 4 is a chart for explaining operation in steps S1020 and S1030 in FIG. 3.

FIG. 4 illustrates operation in steps S1020 and S1030 in the flow chart of FIG. 3. In FIG. 4, circles indicate states with black circle indicating a target state. Dashed arrows indicate order of computation. FIG. 4 illustrates the phase space as a two dimensional space for simplicity. With the assumption that the pendulum 200 with two degrees of freedom at the target state indicated with a black circle is given three different torques $\tau_a, \tau_b, \tau_c$ at predetermined intervals till it reaches the target state, the states before the three different predetermined time intervals are computed. The search tree production unit 101 employs these states as branches of the search tree. Further, with the assumption that three different torques $\tau_a, \tau_b, \tau_c$ are given to respective states that the branches of the search tree indicate, the states before the predetermined time intervals are further computed.

Figure 5:
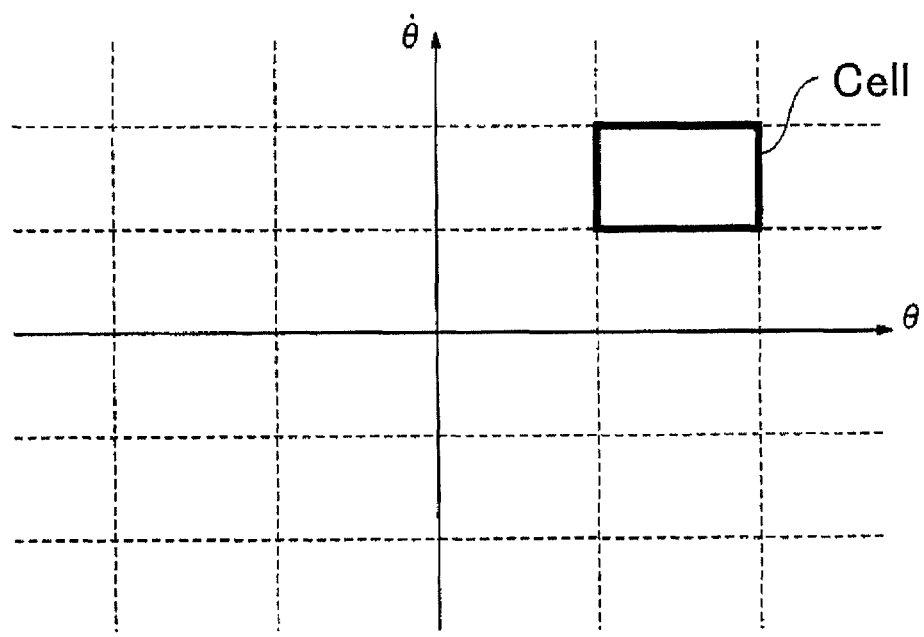
FIG. 5 is a chart illustrating a phase space partitioned into a plurality of sections.

The phase space is divided into a plurality of sections in advance. FIG. 5 illustrates the phase space divided into a plurality of sections. Division may be made such that envisioned range of angle and angular velocity is equally divided. Each of the plurality of sections is called a cell hereafter.

In step S1040 of FIG. 3, the search tree production unit 101 determines whether a branch of the search tree is assigned to a cell to which the state before a predetermined time interval. If it is assigned and registered, the process proceeds to step S1060. If it is not assigned, the process proceeds to step S1045.

In step S1045 of FIG. 3, the search tree production unit 101 determines whether the state of the predetermined time interval represented by the branch that the search tree production unit derives meets the constraints on the phase space. The constraints on the phase space are those constraints that correspond to the regions of the phase space where states cannot exist due to performance of the object or the machine or due to external obstacles. If the state before the predetermined time interval satisfies the constraints on the phase space, the process proceeds to step S1050. If the state before the predetermined time interval does not satisfy the constraints on the phase space, the process proceeds to step S1060.

In step S1050 of FIG. 3, the search tree production unit 101 registers the state before the predetermined time interval that is represented by the branch derived by the search tree production unit 101 as a branch of the search tree. In step S1060 of FIG. 3, the search tree production unit 101 destroys the state before the predetermined time interval that is represented by the branch derived by the search tree production unit 101.

Figure 6:
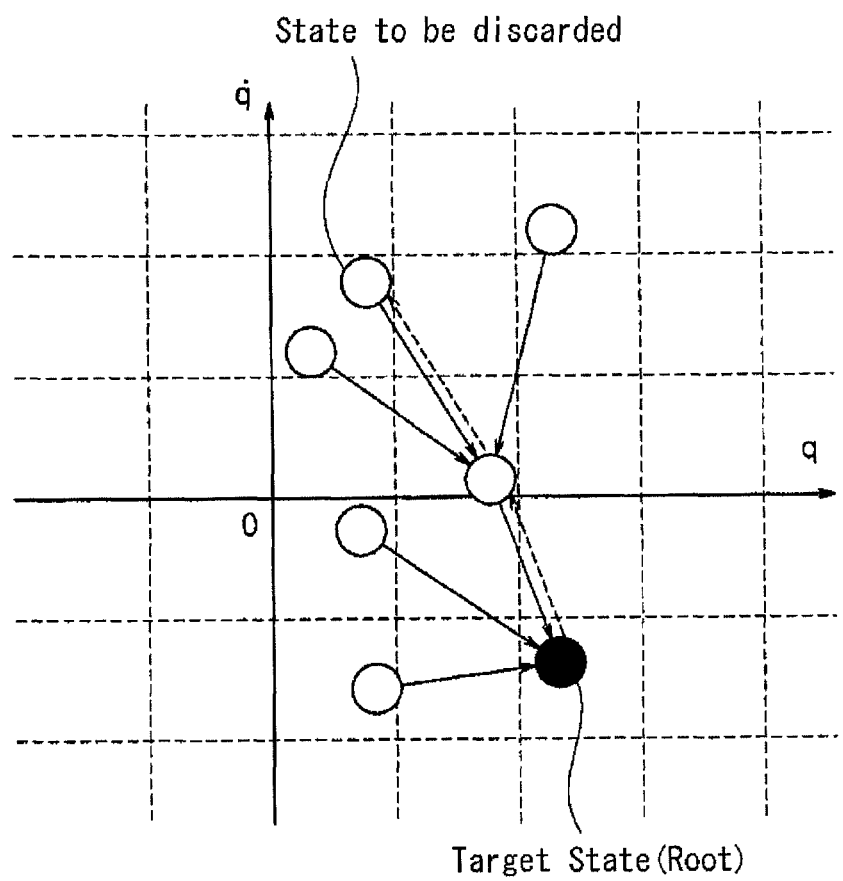
FIG. 6 is a chart for explaining operation in steps S1050 and S1060 in FIG. 3.

FIG. 6 illustrates performance in steps S1050 and S1060 of FIG. 3. In FIG. 6, circles represent respective states and a black circle represents the target state. Solid arrows indicate transitions of the state and dashed arrows indicate order of computation. The direction of state transition as indicated by solid lines is opposite to the direction of the order of computation as indicated by dashed lines. As a principle, only one branch exists in a cell. When the search tree production unit 101 defines a new branch for cell that already has a branch of the tree, the existing branch (state) is destroyed. That is, the states that have close positions in the phase space are unified according to each cell. By unifying conventional branches of the tree with the use of the cells, computation cost may largely be reduced.

In step 1070 of FIG. 3, the search tree production unit 101 determines whether a search has finished. The search tree production unit 101 may determine that the search for transitions during a predetermined time has completed when search of the tree to a predetermined depth is completed or when search for transition during a predetermined time is completed. When completion of a search is determined, the process terminates. When search is determined to have not completed, the process return to step S1030 and search is continued.

Figure 7:
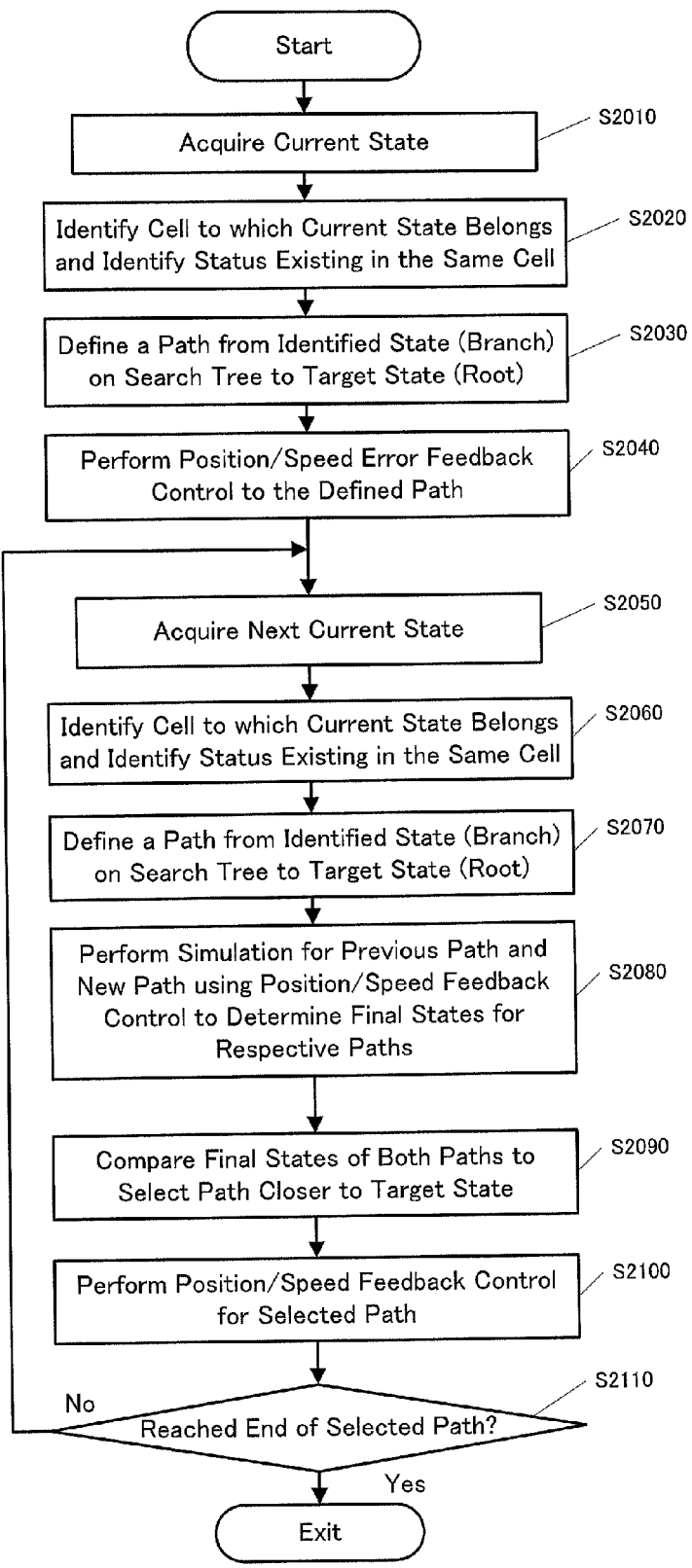
FIG. 7 is a flow chart of a process for producing and controlling a path performed by a path production unit and a path control unit.

FIG. 7 illustrates a process of path generation and path control by the path generation unit 105 and path control unit 107 respectively. In step 2010, the path generation unit 105 acquires current state of the object. Specifically, path generation unit 105 acquires current state of the inverted pendulum 200 with two degrees of freedom based on information from angle sensors provided to the first joint 201 and the second joint 207. The angle sensors correspond to position sensor 109 in FIG. 1.

In step S2020 of FIG. 7, the path generation unit 105 identifies the cell to which current state belongs and identifies state on the search tree or the branch that belongs to the same cell.

Figure 9:
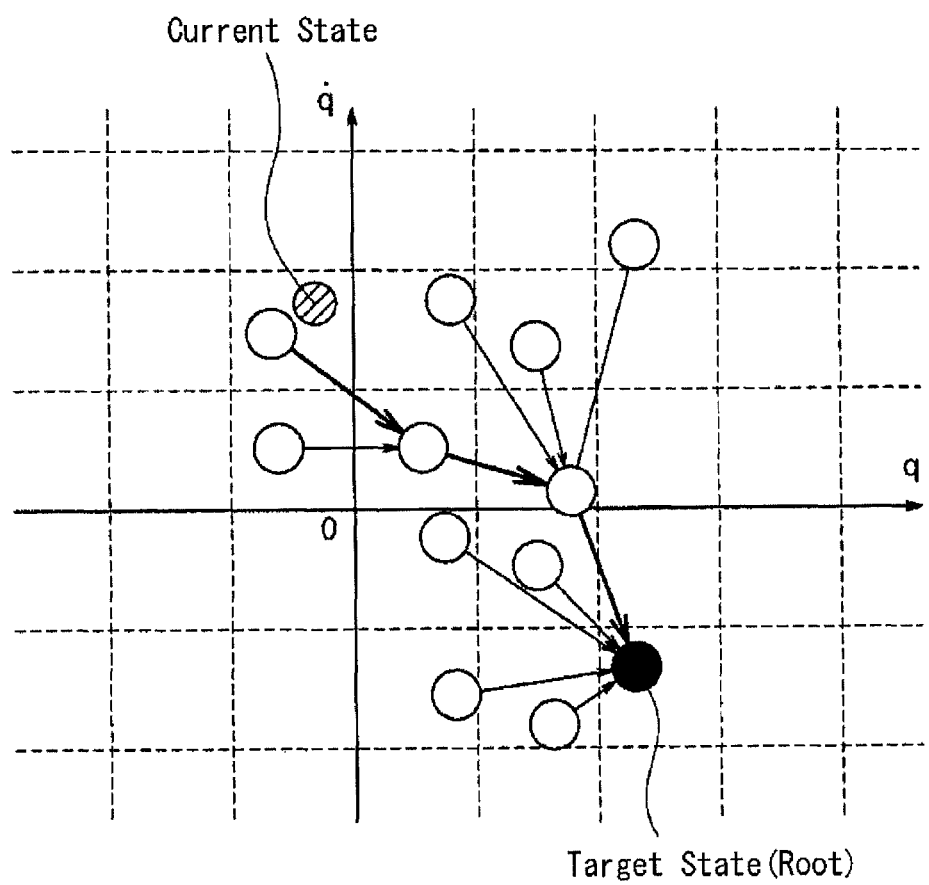
FIG. 9 is a chart for explaining operation of step S2020 in FIG. 7.

FIG. 9 illustrates performance of step S202 of FIG. 7. In FIG. 9, circles indicate state, diagonally shaded circle indicates a current state, and black circle indicates the target state. Solid arrows indicate transitions of state. The process identifies the branch of the search tree existing in the cell where the current state indicated by the shaded circle is.

In step S2030 of FIG. 7, path generation unit 105 specifies a path from the identified state (branch) on the search tree to the target state (root). In FIG. 9, the specified path is shown with bold line.

In step S2040 of FIG. 7, path control unit 107 performs position/speed error feedback control relative to the path specified by path generation unit 105. Position/speed error feedback control will be described hereafter in depth.

In step S2050 of FIG. 7, path generation unit 105 acquires next current state of the object. In step S2060, path generation unit 105 identifies the cell that belongs to the next current state and identifies the state or branch on the search tree that belongs to the same cell.

In step S2070 of FIG. 7, path generation unit 105 identifies a path from the indentified state (branch) on the search tree to the target state (root). In step S2080, path control unit 105 performs simulation utilizing position/speed error feedback control with respect to the path identified previously and the path newly identified to acquire final states for both paths.

Figure 10:
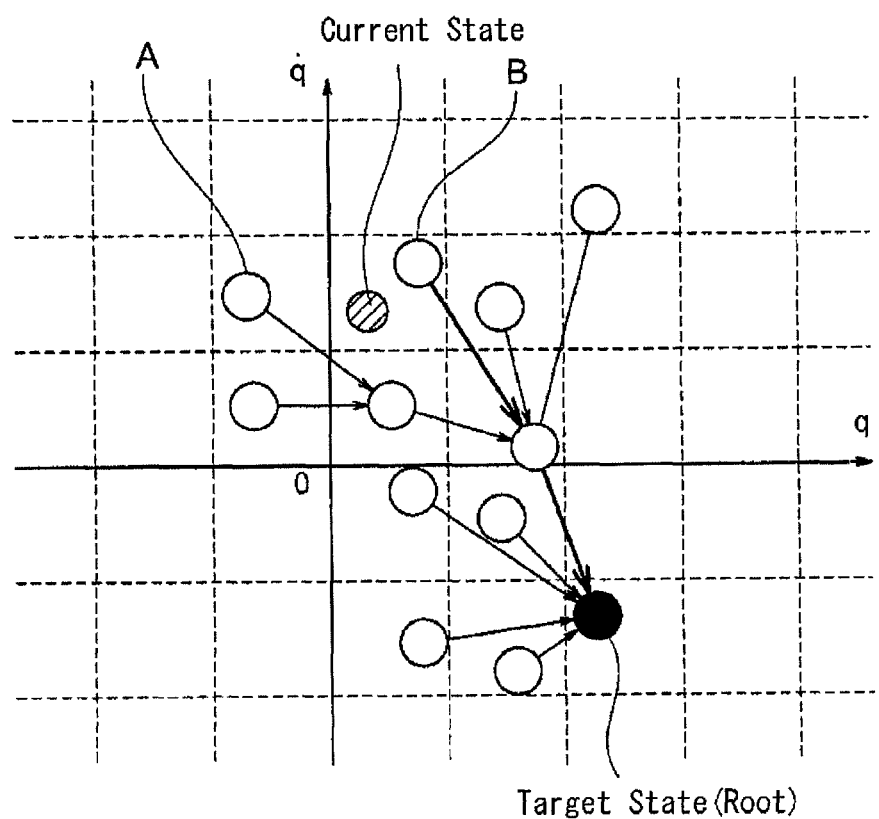
FIG. 10 is a chart for explaining operation of step S2080 in FIG. 7.

FIG. 10 illustrates the performance of step S2080 of FIG. 7. In FIG. 10, circles show states, the shaded circle shows a current state detected by position sensor 109, and the black circle shows the target state. Solid arrows indicate transition of state. Node A is a state on the path that was previously identified, while node B is a state on the path that was newly identified.

In step 2090 of FIG. 7, path generation unit 105 compares the final states of the previous path and the new path that are obtained by simulation and selects the one that is closer to the target state. In FIG. 10, the path shown in bold line that includes node B is selected.

In step 2100 of FIG. 7, the path control unit 107 performs position/speed error feedback control with respect to the path selected by the path generation unit 105. In step 2110, the path control unit 107 determines if the end of the selected path has been reached.

The computation cost of the path generation and path control process shown in FIG. 7 is very low. Specifically, computation in steps S2050 and S2110 can be done within 0.01 second. The computation was performed with a single thread of Intel Core i7-640M processor (2.8 GHz). In accordance with the path generation and path control process shown in FIG. 7, even if the current state of the object deviates from an initial route or a path, the system may cope with such a situation in real time as the computation cost is low.

Figure 8:
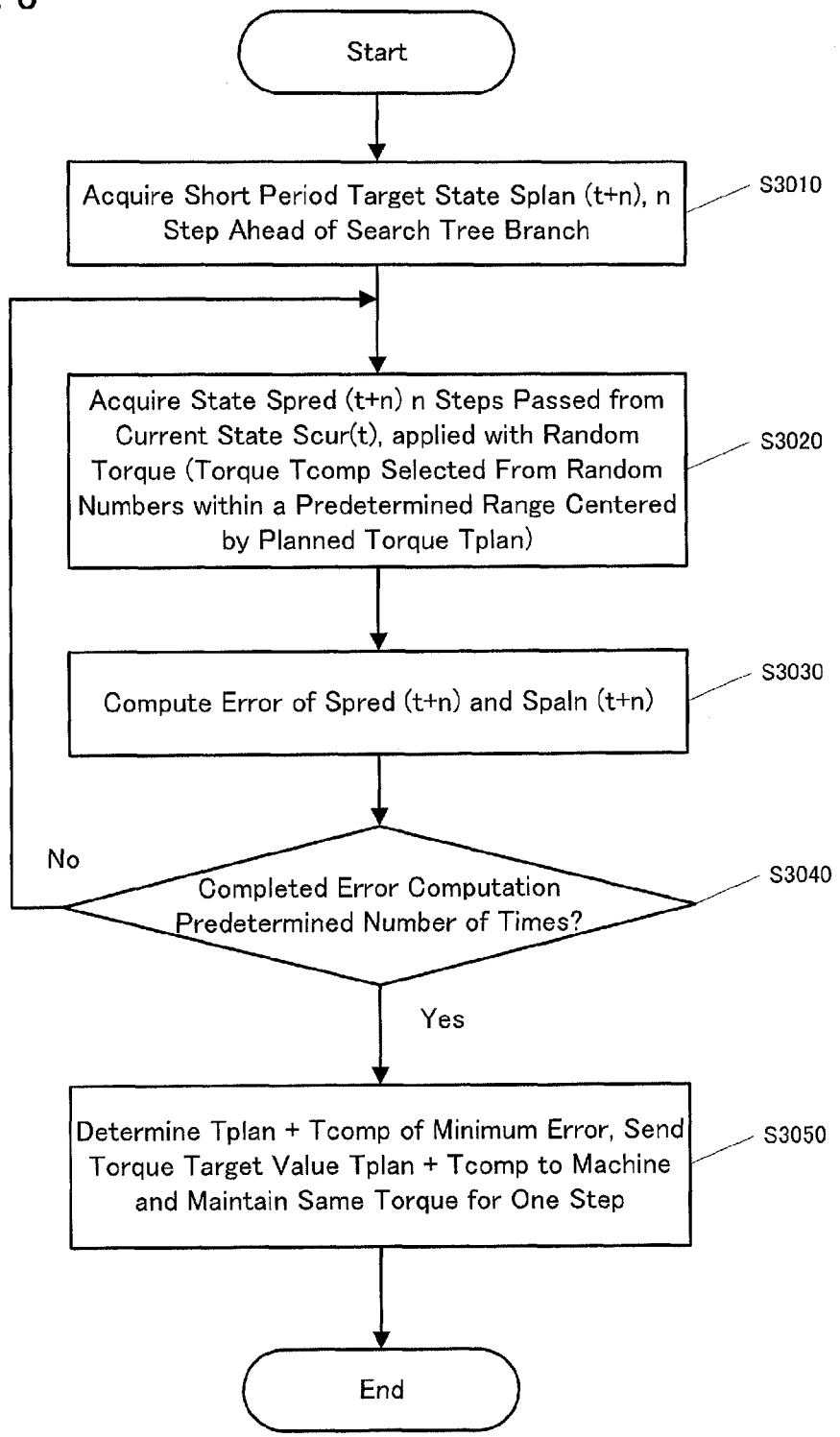
FIG. 8 is a flow chart of a position/speed error feedback control.

Now, position/speed error feedback will be described. FIG. 8 is a flow chart describing the position/speed error feedback control. In step S3010 of FIG. 8, path control unit 107 obtains from a branch of the search tree short period target state Splan (t+n) which is n step ahead.

In step S3020 of FIG. 8, path control unit 107 determines state Spred (t+n) n steps elapsed from the current state Scur (t) applied with random torque (torque Tcomp selected from random numbers within a predetermined range centered with planned torque Tplan).

In step S3030 of FIG. 8, path control unit 107 computes error of Spred (t+n) and Splan (t+n). The error may be represented by the following equation:

$$E(q, \dot{q}) = dist(S(q, \dot{q}), S_g)$$
$$= \sqrt{\sum_i (w_p(q_i - q_{ig})^2 + w_v(\dot{q}_i - \dot{q}_{ig})^2)}$$

where q is position/posture of the object, machine, $w_p$ is weight for the position/posture, $w_v$ is weight for speed.

In step 3040 of FIG. 8, path control unit 107 determines if a predetermined number of error computations has completed. If negative, the process returns to step S3020.

In step S3050 of FIG. 8, path control unit determines Tplan+Tcomp for minimum error, transmits it to the actuator of the machine as a torque target value, maintains the same torque till one step elapses, and terminate the process.

For the path planning method according to the present invention, the present specification employs an inverted pendulum with two degrees of freedom for the object for the convenience of description. The idea of determining a search tree in advance in reverse order of time may be applied to path control method in the state space of any objects.

Now, control experiments by simulation of the inverted pendulum with two degrees of freedom as illustrated in FIG. 2 will be described. The first link 205 of the inverted pendulum 200 with two degrees of freedom has a length of $l_1$ and mass of $m_1$ with its center of gravity 203 at the center of the link. The second link 211 of the inverted pendulum 200 with two degrees of freedom has a length of $l_2$ and mass of $m_2$, with its center of gravity 209 at the center of the link. The acceleration of gravity is represented by g. The equation of motion for the inverted pendulum 200 with two degrees of freedom is:

$$(\alpha + \gamma + 2\beta\cos\theta_2)\ddot{\theta}_1 + (\gamma + \beta\cos\theta_2)\ddot{\theta}_2 -$$
$$\beta(2\dot{\theta}_1 + \dot{\theta}_2)\dot{\theta}_2\sin\theta_2 + k_1\cos\theta_1 + k_2\cos(\theta_1 + \theta_2) = \tau_1$$
$$(\gamma + \beta\cos\theta_2)\ddot{\theta}_1 + \gamma\ddot{\theta}_2 + \beta\dot{\theta}_1^2\sin\theta_2 + k_2\cos(\theta_1 + \theta_2) = \tau_2$$

-continued $$\alpha = I_1 + \frac{1}{4}m_1 l_1^2 + m_2 l_1^2 \quad k_1 = \left(\frac{1}{2}m_1 l_1 + m_2 l_1\right) g$$
$$\beta = \frac{1}{2}l_1 m_2 l_2 \quad k_2 = \frac{1}{2}m_2 l_2 g$$
$$\gamma = I_2 + \frac{1}{4}m_2 l_2^2$$

For easy understanding of the relation of joint angles and gravity, coordinates are converted as follows:

$$q_1 = \theta_1 - \frac{\pi}{2}$$
$$q_2 = \theta_2$$

Figure 11:
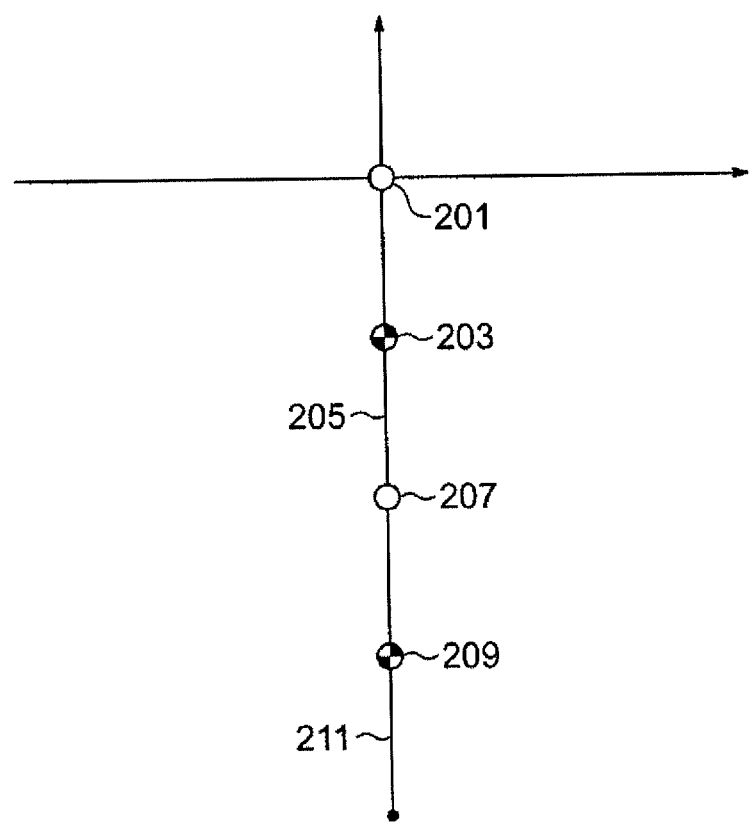
FIG. 11 illustrates an initial state of the inverted pendulum with two degrees of freedom.
Figure 12:
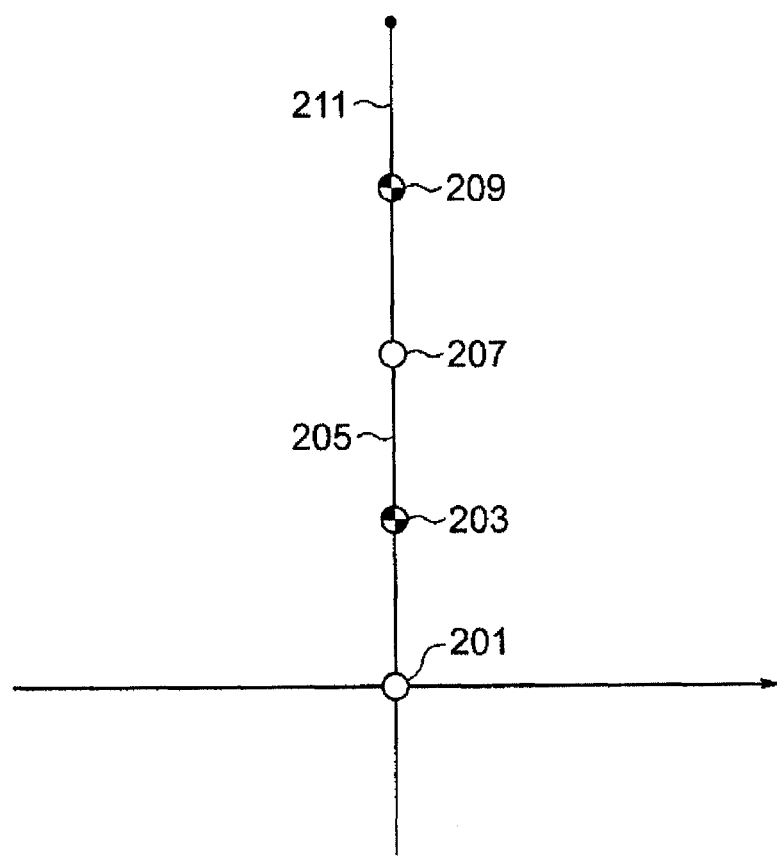
FIG. 12 illustrates a target state of the inverted pendulum with two degrees of freedom.

FIG. 11 illustrates an initial state of the inverted pendulum 200 with two degrees of freedom. The coordinates of the initial state are as follows:

$$(q_1, \dot{q}_1) = (-\pi, 0)$$
$$(q_2, \dot{q}_2) = (0, 0)$$

An experiment was conducted by simulating the process of path generation and path control as shown in FIG. 7 and simulating motions of the inverted pendulum 200 with two degrees of freedom. Table 1 below indicates settings of experimental simulation. The time interval to the previous state as described above corresponds to torque switching time step in Table 1.

TABLE 1

| Time Step | Torque Switching Time Step | Optimizing Method |
| --- | --- | --- |
| 5 [ms] | Every 100 [ms] | Final State Optimization |

Table 2 below indicates parameters of the first and second joints respectively. In Table 2, with respect to the first joint, maximum torque 2 [Nm], torque particle size 10 divisions for generation of search tree indicate that a torque range of −2 [Nm] to 2 [Nm] is divided by 10 when a new branch is to be derived such that, for example, torques are given for −1.8 [Nm], −1.4 [Nm], −1.0 [Nm], . . . , 1.0 [Nm], 1.4 [Nm], 1.8 [Nm] to determine next state (angle and angular velocity) from the equation of motion. In the experiment, ten different torques are given to the first and the second joints respectively. As a result, a hundred different next states are derived. Motion of the object may be restricted by adjusting the value of maximum torque.

TABLE 2

| | Link length | Weight | Max torque | Torque particle size for search tree generation | State division in phase space |
| --- | --- | --- | --- | --- | --- |
| 1st joint | 0.5 [m] | 0.5 [kg] | 2 [Nm] | 10 divisions | 12 div. (angle) 12 div. (angular velocity) |
| 2nd joint | 0.5 [m] | 0.5 [kg] | 1 [Nm] | 10 div. | 12 div. (angle) 20 div. (angular velocity) |

Figure 13:
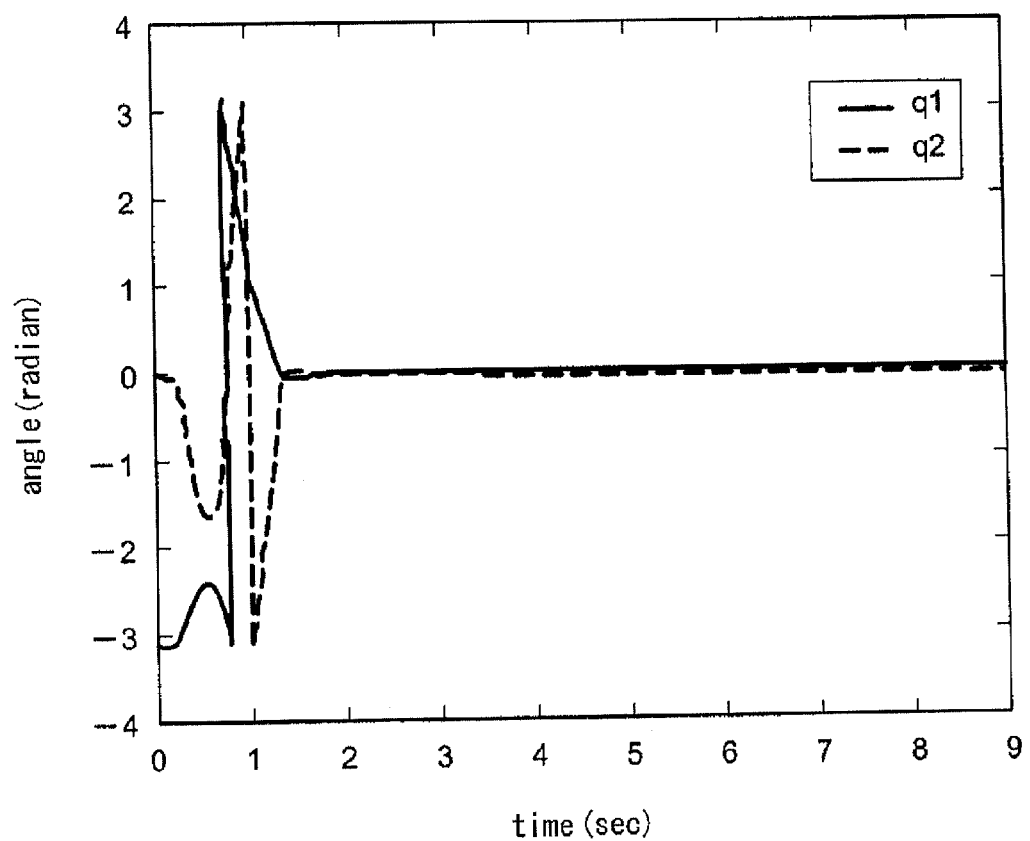
FIG. 13 illustrates transition of angle $q_1$ of a first joint and angle $q_2$ of a second joint of the inverted pendulum with two degrees of freedom acquired by an experiment.

FIG. 13 shows transition by experiment of angle $q_1$ of the first joint 201 and angle $q_2$ of the second joint 207 of the inverted pendulum 200. The horizontal axis indicates time in seconds. The vertical axis indicates angle in radian. The initial values of angles $q_1$ and $q_2$ are $-\pi$ and 0 respectively. Angles $q_1$ and $q_2$ change into the target state in approximately 1.3 seconds from the initial states respectively.

Figure 14:
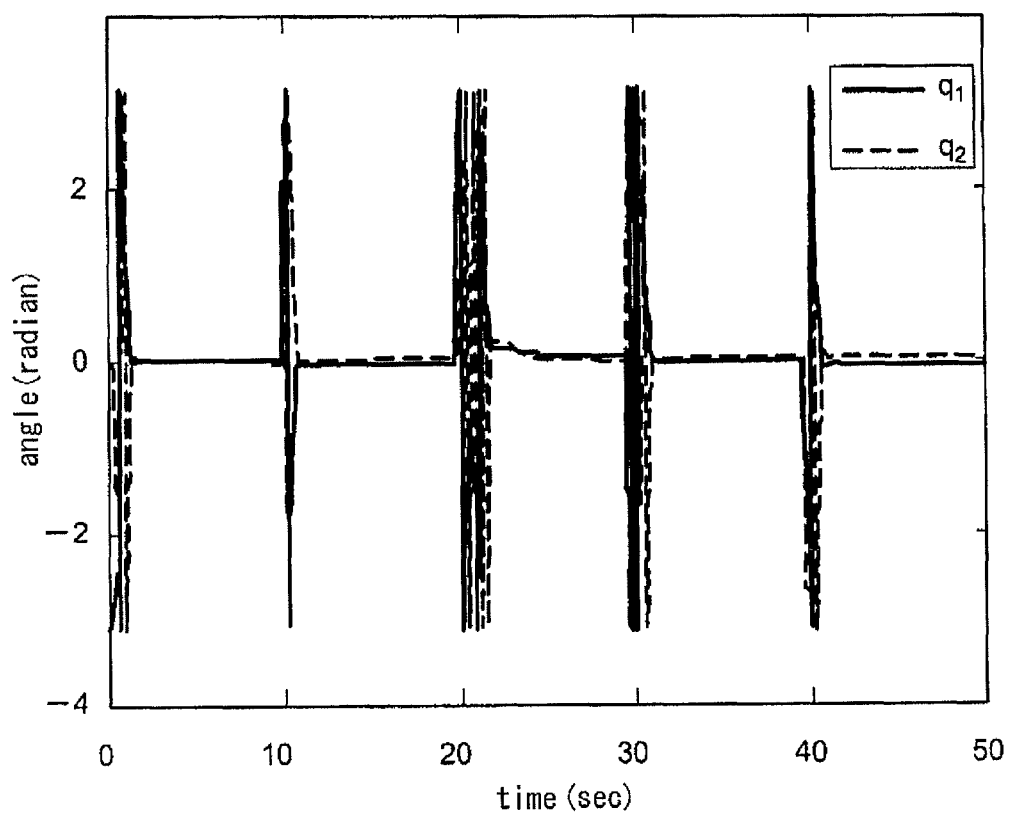
FIG. 14 illustrates transition of angle $q_1$ of a first joint and angle $q_2$ of a second joint of the inverted pendulum with two degrees of freedom acquired by another experiment.

FIG. 14 shows transition by another experiment of angle $q_1$ of the first joint 201 and angle $q_2$ of the second joint 207 of the inverted pendulum 200. The horizontal axis indicates time in seconds. The vertical axis indicates angle in radian. The initial values of angles $q_1$ and $q_2$ are $-\pi$ and 0 respectively. In this experiment, External disturbance was applied every 10 seconds from the start of control that disturbed the states of the inverted pendulum 200. The other conditions were the same as the above described experiment. Angles $q_1$ and $q_2$ changed into the target state within 2 seconds from addition of the disturbance.

As described above, according to the path planning and control method as well as path planning/control system, an overall search with a search tree may be performed in real time. Thus, the invention may be used real time control for resuming a stable state when machines such as humanoid robots, aircrafts and automobiles fall into unstable state.

What is claimed is:

1. Method for determining a path for controlling by a path planning system for bringing a state of an object to a target state, comprising:
    defining, by a search tree production unit, said target state in a state space as a root;
    defining, by the search tree production unit, a state at a time before a predetermined time interval in the state space as a branch;
    determining, by the search tree production unit, whether a branch is assigned to each one of a plurality of sections of the state space, said state space being divided into the plurality of sections in advance;
    producing, by the search tree production unit, a search tree having only one branch at each one of the a plurality of sections, by registering a branch when the branch satisfies constraints on the state space at the time before the predetermined time interval, and destroying a branch when the branch does not satisfy the constraints;
    determining, by a path generation unit, a current state of said object;
    determining, by the path generation unit, a branch of the search tree that corresponds to the current state; and
    determining, by the path generation unit, as a path of the object, a route on the search tree from the branch corresponding to the current state to the root,
    wherein the object is a member of a robot, and wherein the robot controls the member according to the route on the search tree.

2. The method according to claim 1, wherein motion of the object is restricted by defining the range of state space to which states may belong.

3. The method according to claim 1, wherein each one of the branches of the search is determined as the state that is a predetermined time interval or a multiple of the predetermined time intervals prior to the target state.

4. The method according to claim 1, wherein the object includes one or more members whose ends are connected by joints except tip ends.

5. The method according to claim 1, wherein the object is a member of a robot.

6. The method according to claim 1, wherein the state space is a phase space.

7. Method of path control, comprising:
    in accordance with the route on the search tree determined by the method of claim 1, controlling the path of the object to bring the state of the object into the target state.

8. The method of path control according to claim 7, wherein controlling the path of the object to bring the state of the object into the target state includes:
    determining a new route on the search tree by defining a branch of the tree that is close to a current state of the object; and
    controlling the path according to one of a previous route on the search tree and the new route.

9. A path planning/control system for bringing state of an object into a target state, comprising:
    a search tree production unit for
    defining said target state in a state space as a root,
    defining a state at a time before a predetermined time interval in the state space as a branch,
    determining whether a branch is assigned to each one of a plurality of sections of the state space, said state space being divided into the plurality of sections in advance, and
    producing a search tree having only one branch at each one of the a plurality of sections, by registering a branch when the branch satisfies constraints on the state space at the time before the predetermined time interval, and destroying a branch when the branch does not satisfy the constraints;
    a search tree memory unit for storing the search tree;
    a path generation unit for determining, as a path of the object, a route on the search tree from the branch corresponding to the current state to the root; and
    a path control unit for controlling the path of the object to bring the state of the object into the target state in accordance with the route on the search tree determined by the path planning system,
    wherein the object is a member of a robot, and wherein the robot controls the member according to the route on the search tree.

10. The system according to claim 9, wherein motion of the object is restricted by defining the range of state space to which states may belong.

11. The system according claim 9, wherein motion of the object is restricted by defining constraints to dynamic relations in the predetermined time intervals.

12. The system according to claim 9, wherein the state space is a phase space.

* * * * *